(12) United States Patent
Sato et al.

(10) Patent No.: US 10,773,491 B2
(45) Date of Patent: Sep. 15, 2020

(54) LAMINATE, PACKAGING BAG, PACKAGING BAG WITH PLUG, AND PACKAGING BAG WITH PLUG WITH HYDROGENOUS-WATER

(71) Applicant: HOSOKAWA YOKO CO., LTD., Chiyoda-ku, Tokyo (JP)

(72) Inventors: Syota Sato, Sayama (JP); Hiroyuki Arai, Fujimino (JP); Tomoya Kagawa, Iruma-gun (JP)

(73) Assignee: HOSOKAWA YOKO CO., LTD., Tokyo (JP)

( * ) Notice: Subject to any disclaimer, the term of this patent is extended or adjusted under 35 U.S.C. 154(b) by 242 days.

(21) Appl. No.: 15/575,872

(22) PCT Filed: Jun. 27, 2016

(86) PCT No.: PCT/JP2016/068986
§ 371 (c)(1),
(2) Date: Nov. 21, 2017

(87) PCT Pub. No.: WO2017/002753
PCT Pub. Date: Jan. 5, 2017

(65) Prior Publication Data
US 2018/0147814 A1 May 31, 2018

(30) Foreign Application Priority Data
Jul. 1, 2015 (JP) .................. 2015-132693

(51) Int. Cl.
| A23L 2/54 | (2006.01) |
| B32B 7/12 | (2006.01) |
| B65D 65/40 | (2006.01) |
| B65D 75/58 | (2006.01) |
| B32B 15/08 | (2006.01) |
| C09J 163/00 | (2006.01) |

(Continued)

(52) U.S. Cl.
CPC .................. *B32B 7/12* (2013.01); *A23L 2/54* (2013.01); *B32B 15/08* (2013.01); *B32B 27/00* (2013.01);

(Continued)

(58) Field of Classification Search
CPC ........... B32B 1/02; B32B 27/08; B65D 85/72; B65D 75/008; B31B 2155/002; Y10T 428/12; Y10T 428/1355; Y10T 428/31551

(Continued)

(56) References Cited

U.S. PATENT DOCUMENTS

2005/0158494 A1\* 7/2005 Koyama ................. B32B 27/08
428/35.7
2010/0015431 A1 1/2010 Matsui et al.

(Continued)

FOREIGN PATENT DOCUMENTS

CN 102574381 7/2012
JP 2001-287752 10/2001

(Continued)

OTHER PUBLICATIONS

Chinese Office Action for Application No. 201680034369.1 dated Aug. 12, 2019.

(Continued)

*Primary Examiner* — Lee E Sanderson
(74) *Attorney, Agent, or Firm* — Nixon Peabody LLP; Jeffrey L. Costellia

(57) ABSTRACT

The present invention provides a laminate (10A) having a first gas barrier layer (11) formed of a gas barrier transparent resin film and a second gas barrier layer (12) formed of a metal foil, in which at least one adhesive layer (X) (21) formed of an adhesive (x) including a polyepoxy resin as a main ingredient and a polyamine resin as a curing agent is provided between the first gas barrier layer (11) and the second gas barrier layer (12).

9 Claims, 3 Drawing Sheets

(51) Int. Cl.
  *C09J 175/04* (2006.01)
  *B32B 27/00* (2006.01)

(52) U.S. Cl.
  CPC ............ *B65D 65/40* (2013.01); *B65D 75/58* (2013.01); *B65D 75/5883* (2013.01); *C09J 163/00* (2013.01); *C09J 175/04* (2013.01); *A23V 2002/00* (2013.01); *B32B 2307/412* (2013.01); *B32B 2307/7242* (2013.01); *B32B 2439/46* (2013.01); *B32B 2439/70* (2013.01); *B65D 2565/387* (2013.01); *B65D 2575/586* (2013.01)

(58) Field of Classification Search
  USPC ....... 220/107; 206/581, 823; 428/35.3, 35.8, 428/425.8; 383/105, 109, 113
  See application file for complete search history.

(56) References Cited

U.S. PATENT DOCUMENTS

2011/0097020 A1* 4/2011 Rasile .................... B32B 27/32
                                                    383/105

2013/0028540 A1   1/2013  Matsumoto et al.
2013/0292287 A1* 11/2013  Stanley ................. B65D 85/00
                                                    206/459.5

FOREIGN PATENT DOCUMENTS

| | | | |
|---|---|---|---|
| JP | 2006-036272 | | 2/2006 |
| JP | 2006036272 A | * | 2/2006 |
| JP | 2009-280251 | | 12/2009 |
| JP | 2011-098474 | | 5/2011 |
| JP | 2015-030184 | | 2/2015 |
| JP | 2015-068484 | | 4/2015 |
| JP | 2015-209255 | | 11/2015 |
| JP | 2015209255 A | * | 11/2015 |
| WO | WO-2008-059925 | | 5/2008 |
| WO | WO-2009-075145 | | 6/2009 |
| WO | WO-2011-132637 | | 10/2011 |
| WO | WO-2016-063961 | | 4/2016 |

OTHER PUBLICATIONS

International Search Report for PCT/JP2016/068986 dated Sep. 13, 2016.
Written Opinion for PCT/JP2016/068986 dated Sep. 13, 2016.

* cited by examiner

LAMINATE, PACKAGING BAG, PACKAGING BAG WITH PLUG, AND PACKAGING BAG WITH PLUG WITH HYDROGENOUS-WATER

TECHNICAL FIELD

The present invention relates to a laminate suitably used for producing a packaging bag, a packaging bag using the laminate, a packaging bag with a plug formed by attaching a plug to the packaging bag, and a hydrogenous water containing packaging bag with a plug formed by filling the packaging bag with a plug with hydrogenous water.

Priority is claimed on Japanese Patent Application No. 2015-132693, filed on Jul. 1, 2015, the content of which is incorporated herein by reference.

BACKGROUND ART

As packaging materials for packaging foods, industrial products and the like, laminates provided with a gas barrier layer to prevent permeation of gas have been widely used. Among these, in applications that require particularly high gas barrier properties, two gas barrier layers are provided in a laminate in some cases.

For example, Patent Document 1 discloses a packaging material in which a layer of an inorganic compound vapor deposition film on which a thin film of an inorganic compound is vapor-deposited is provided on one outermost surface of a laminate as a first gas barrier layer, and a layer formed of an aluminum foil is provided as a second gas barrier layer. In the packaging material, a layer formed of a nylon film is provided between the first gas barrier layer and the second gas barrier layer, and each of the layers is bonded to one another by a dry lamination method using an adhesive.

As adhesives used in the dry lamination method, there are aqueous adhesives and organic solvent adhesives, and among these, a solvent two-component reaction polyurethane-based adhesive is frequently used. The two-component reaction polyurethane-based adhesive includes a main ingredient (polyol component) having a hydroxyl group at the polymer terminal and a curing agent (polyisocyanate component) having an isocyanate group and is cured by forming a urethane bond by the reaction of the hydroxyl group and the isocyanate group.

However, in a case in which there is moisture in the reaction process during curing, the two-component reaction polyurethane-based adhesive generates carbon dioxide resulting from the reaction of the moisture and the isocyanate group of the curing agent. Therefore, in a case in which the two-component reaction polyurethane-based adhesive is used between the first gas barrier layer and the second gas barrier layer, there is a problem in external appearance.

That is, since both the first gas barrier layer and the second gas barrier layer have gas barrier properties, it is difficult to release the carbon dioxide generated from the adhesive to the outside air through these layers. Therefore, the carbon dioxide remains between the first gas barrier layer and the second gas barrier layer in the form of bubbles.

Then, such bubbles become visible from the outside through the transparent first gas barrier layer and a defect in the external appearance occurs. In addition, in a case in which small bubbles coalesce to form large bubbles, there is a possibility that the large bubbles may cause delamination.

Patent Document 2 discloses a technique of, in a case in which a first gas barrier layer formed of a plastic film on which a thin inorganic film is vapor-deposited, and a second gas barrier layer formed of an aluminum foil are bonded to each other with an adhesive, arranging the first gas barrier layer such that the side of the first gas barrier layer on which the thin inorganic film is not vapor-deposited is brought into contact with the adhesive. According to Patent Document 2, carbon dioxide generated from the adhesive is absorbed by the plastic film or is absorbed by the plastic film and then released from the end face of the plastic film to the outside air. Thus, the carbon dioxide does not remain in the laminate in the form of bubbles.

CITATION LIST

Patent Document

[Patent Document 1] Japanese Unexamined Patent Application, First Publication No. 2006-036272
[Patent Document 2] Japanese Unexamined Patent Application, First Publication No. 2015-030184

SUMMARY OF INVENTION

Technical Problem

However, as in Patent Document 2, in the case in which the first gas barrier layer is arranged such that the side of the first gas barrier layer on which the thin inorganic film is not vapor-deposited is brought into contact with the adhesive, the side on which the thin inorganic film is vapor-deposited forms the outermost surface of the laminate. In this case, there is a possibility of deterioration in gas barrier properties due to the thin inorganic film peeling off. In order to suppress the peeling-off of the thin inorganic film, there is a method of providing a surface protective layer on the thin inorganic film. However, in this case, the cost for providing the surface protective layer is required, and thus this case is not preferable. In addition, in Patent Document 2, in a case in which the material of the plastic film is nylon, the effect cannot be obtained, and thus there is a problem of limiting the material of the plastic film.

Further, in the technique of Patent Document 2, since the generation of carbon dioxide itself from the adhesive is not suppressed, there is a possibility that the total amount of the carbon dioxide generated may not be absorbed by the plastic film or may not be released from the end face of the plastic film to the outside air, and in this case, the carbon dioxide remains in the laminate and a defect in the external appearance occurs.

The present invention is made in consideration of the above circumstances and an object thereof is to provide a laminate having excellent gas barrier properties in which generation of bubbles is reliably suppressed without separately providing a surface protective layer or the like and a defect in the external appearance does not occur, a packaging bag using the laminate, a packaging bag with a plug formed by attaching a plug to the packaging bag, and a hydrogenous water containing packaging bag with a plug formed by filling the packaging bag with a ping with hydrogenous water.

Solution to Problem

The present invention has the following configuration.
[1] A laminate including: a plurality of gas barrier layers, in which at least one adhesive layer (X) formed of an adhesive (x) having a polyepoxy resin as a mam ingredient and a polyamine resin as a curing agent is provided between an arbitrary gas barrier layer and another gas barrier layer.

[2] The laminate according to [1], in which the laminate has a first gas barrier layer and a second gas barrier layer as the plurality of gas barrier layers, and the first gas barrier layer is formed of a gas barrier transparent resin film.

[3] The laminate according to [2], in which the second gas barrier layer is formed of a metal foil.

[4] The laminate according to any one of [1] to [3] which is a laminate formed by laminating, a member formed of one arbitrary gas barrier layer and a member formed of one another gas barrier layer, a member formed of one arbitrary gas barrier layer and a member formed of a laminate having one another gas barrier layer, or a member formed of a laminate having one arbitrary gas barrier layer and a member formed of a laminate having one another gas barrier layer, with the adhesive layer (X).

[5] The laminate according to [4], in which in a case in which the member is a laminate, the laminate has an adhesive layer (Y) formed of an adhesive (y) having a polyol component as a main ingredient and a polyisocyanate component as a curing agent.

[6] The laminate according to any one of [1] to [5], further including: a sealant layer, in which the sealant layer forms any one of outermost surfaces of the laminate.

[7] A packaging bag including: the laminate according to any one of [1] to [6].

[8] A hydrogenous water containing packaging bag formed by filling the packaging bag according to [7] with hydrogenous water.

[9] A packaging bag with a plug formed by attaching a plug to the packaging bag according to [7].

[10] The packaging bag with a plug according to [9], in which the plug has barrier properties.

[11] The packaging bag with a plug according to [10], in which the plug has a cap and the cap has barrier properties.

[12] A hydrogenous water containing packaging bag with a plug formed by filling the packaging bag with a plug according to any one of [9] to [11] with hydrogenous water.

Effects of Invention

According to the present invention, it is possible to provide a laminate having excellent gas barrier properties in which generation of bubbles is reliably suppressed without separately providing a surface protective layer or the like and a defect in the external appearance does not occur, a packaging bag using the laminate, a packaging bag with a plug formed by attaching a plug to the packaging bag, and a hydrogenous water containing packaging bag with a plug formed by filling the packaging bag with a plug with hydrogenous water.

DESCRIPTION OF EMBODIMENTS

Hereinafter, the present invention will be described in detail.

[Laminate]

A laminate of the present invention is a laminate having a plurality of gas barrier layers.

Figure 1:
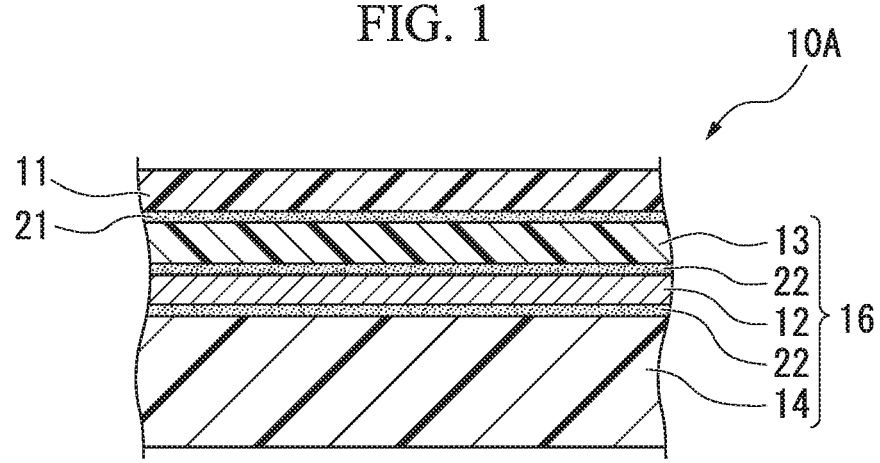
FIG. 1 is a cross-sectional view showing an example of a laminate of the present invention.

FIG. 1 is a cross-sectional view showing an example of the laminate of the present invention, and a laminate 10A in this example has two gas barrier layers of a first gas barrier layer 11 and a second gas barrier layer 12. In addition, the laminate 10A in this example further has a base layer 13 and a sealant layer 14, and each layer is bonded to one another by an adhesive layer. Specifically, the first gas barrier layer 11, an adhesive layer (X) 21, the base layer 13, an adhesive layer (Y) 22, the second gas barrier layer 12, the adhesive layer (Y) 22, and the sealant layer 14 are sequentially laminated.

In this example, the first gas barrier layer 11 is formed of a gas barrier transparent resin film imparted with gas barrier properties by providing an inorganic vapor deposition membrane formed of alumina or the like on the surface thereof and forms one outermost surface of the laminate 10A. The inorganic vapor deposition membrane is provided on an inner surface of the first gas barrier layer 11, that is, a surface which is in contact with the adhesive layer (X) 21. In this example, the surface of the gas barrier transparent resin film on which the inorganic vapor deposition membrane is formed may be printed (not shown) from the viewpoint of designability or the like.

As the transparent resin film, for example, films formed of polyethylene terephthalate (PET), polyester other than PET, polyamide, polypropylene, and the like can be used and from the viewpoint of strength or the like, a PET film is preferable. In a case of using a film formed of PET, polyamide, or polypropylene, it is preferable that the film is a biaxially stretched film.

The transparent resin film may be a multilayer film formed by co-extruding two or more kinds of materials or the like. For example, the first gas barrier layer 11 may be formed of a film in which an inorganic vapor deposition membrane is provided on a transparent multilayer film formed of two or more kinds of transparent resin films.

Although the thickness of the first gas barrier layer 11 is not particularly limited, for example, the thickness thereof is preferably 5 to 30 μm and more preferably 7 to 16 μm. In a case in which the thickness is equal to or more than the lower limit of the above range, sufficient strength is obtained and in a case in which the thickness is equal to or less than the upper limit of the above range, the thickness of the laminate 10A is not increased more than required.

In order to impart gas barrier properties to the transparent resin film, in addition to the above-described method of providing the inorganic vapor deposition membrane, a method of providing a chemical vapor deposition membrane, a barrier coat membrane, or the like can be employed.

The second gas barrier layer 12 in this example is formed of a metal foil such as an aluminum foil and is arranged at a position other than the outermost surface of the laminate 10A.

For the second gas barrier layer 12, for example, a gas barrier transparent resin film imparted with gas barrier properties by providing an inorganic vapor deposition membrane, a chemical vapor deposition membrane, a barrier coat membrane, or the like on a film formed of PET, polyester other than PET, polyamide, polypropylene, or the like may be used. However, from the viewpoint of obtaining further excellent gas barrier properties, it is preferable to use a metal foil.

Although the thickness of the second gas barrier layer 12 is not particularly limited, in a case of using a metal foil, the thickness is preferably 4 to 30 μm and more preferably 6 to 9 μm. In a case in which the thickness is equal to or more than the lower limit of the above range, sufficient gas barrier properties are obtained and in a case in which the thickness is equal to or less than the upper limit of the above range, the thickness of the laminate 10A is not increased more than required.

The laminate 10A in this example has the base layer 13 formed of a biaxially stretched polyamide film. By providing the base layer 13 in the laminate 10A, various properties (for example, bending resistance, piercing resistance, impact resistance, abrasion resistance, cold resistance, heat resistance, and chemical resistance) according to the kind of the base layer 13 can be imparted to the laminate 10A. As in this example, in the case of using a biaxially stretched polyamide film for the base layer 13, piercing resistance, impact resistance, and the like can be imparted to the laminate 10A.

As the film forming the base layer 13, in addition to the biaxially stretched polyamide film, depending on applications, uniaxially or biaxially stretched films of PET, polyester other than PET, polyamide, polypropylene, polyethylene, polyvinyl chloride, polycarbonate, polyvinyl alcohol, an ethylene-vinyl acetate copolymer saponified product, and the like, or unstretched films can be used. These films may be used alone or may be used by laminating two or more kinds thereof.

The thickness of the base layer 13 is not particularly limited and can be appropriately set according to the properties required for the laminate 10A or the like. For example, the thickness thereof is preferably 9 to 30 μm and is more preferably 12 to 16 μm.

The laminate 10A in this example has the heat scalable sealant layer 14 formed of a straight chain (linear) low density polyethylene film (LLDPE) as a layer forming the other outermost surface of the laminate 10A. By providing such a sealant layer 14 in the laminate 10A, a packaging bag can be formed by a method of heat-sealing the sealant layers 14. While the sealant layer 14 becomes the innermost layer in contact with a content in a case of forming a packaging bag using the laminate 10A, the first gas barrier layer 11 becomes the outermost layer in contact with the outside air.

The sealant layer 14 may be formed of a material having heat scalability and is not limited to LLDPE. Examples of the material having heat scalability include Sow density polyethylene (LDPE), medium density polyethylene, high density polyethylene (HDPE), an ethylene-vinyl acetate copolymer, an ionomer resin, an ethylene-acrylic acid copolymer, an ethylene-methyl acrylate copolymer, an ethylene-methacrylic acid copolymer, polypropylene, and an ethylene-propylene copolymer. In the sealant layer 14, a film or a resin formed of one or more kinds of these resins can be used. In addition, the sealant layer 14 may have a multilayer structure in which a plurality of layers formed of one or more kinds of these resins are laminated.

Although the thickness of the sealant layer 14 is not particularly limited, for example, the thickness thereof is preferably 30 to 150 μm and more preferably 50 to 80 μm. In a case in which the thickness is equal to or more than the lower limit of the above range, sufficient heat scalability is obtained and in a case in which the thickness is equal or less than the upper limit of the above range, the thickness of the laminate 10A is not increased more than required.

The laminate 10A in this example has each layer which is bonded to one another by a dry lamination method using an adhesive and has the adhesive layer (X) 21 and the adhesive layer (Y) 22 of which the kinds of the adhesives forming the adhesive layers are different from each other as adhesive layers.

The adhesive layer (X) 21 is formed of an adhesive (x) having a polyepoxy resin as a main ingredient and a polyamine resin as a curing agent. A gas such as carbon dioxide is not generated in the reaction process in a case in which the adhesive (x) is cured to form the adhesive layer (X).

On the other hand, the adhesive layer (Y) 22 is formed of an adhesive (two-component reaction polyurethane-based adhesive) (y) including a polyol component having a hydroxyl group at the polymer terminal as a main ingredient and a polyisocyanate component having a hydroxyl group at the polymer terminal as a curing agent. Carbon dioxide is generated in the reaction process in a case in which the adhesive (y) is cured to form the adhesive layer (Y).

As the adhesive (x), an adhesive having the following (1) as a main ingredient and the following (2) as a curing agent is preferable. As the two-component adhesive (x) having the main ingredient and the curing agent, a two-component epoxy resin (product name "MAXIVE") manufactured by Mitsubishi Gas Chemical Company, Inc. can be used. The "MAXIVE" contains a solvent.

(1) a polyepoxy resin having a glycidyl amine moiety derived from meta-xylylene diamine (2) a polyamine resin formed of a reaction product of meta-xylylene diamine or para-xylylene diamine, and acrylic acid, methacrylic acid, a derivative of acrylic acid or a derivative of methacrylic acid Although the thickness of each of the adhesive layer (X) and the adhesive layer (Y) is not particularly limited, in terms of an application amount per 1 m$^2$, the thickness of the adhesive layer (X) is, for example, preferably 0.5 to 7.0 g/m$^2$ and more preferably 1.0 to 5.0 g/m$^2$, and the thickness of the adhesive layer (Y) is, for example, preferably 2.0 to 5.0 g/m$^2$ and more preferably 2.5 to 4.0 g/m$^2$. In a case in which the thickness is equal to or more than the lower limit of the above range, sufficient adhesiveness is obtained and in a case in which the thickness is equal to or less than the upper limit of the above range, the thickness of the laminate 10A is not increased more than required.

The laminate 10A may have one or more layers other than the first gas barrier layer 11, the second gas barrier layer 12, the adhesive layer (X) 21, the adhesive layer (Y) 22, the base layer 13, and the sealant layer 14. Various resin films can be used according to the properties required for the laminate (for example, bending resistance, piercing resistance, impact resistance, abrasion resistance, cold resistance, heat resistance, and chemical resistance) to form other layers.

Specifically, resin films of PET, polyester other than PET, polyamide, polyvinyl chloride, polycarbonate, polyvinyl alcohol, an ethylene-vinyl acetate copolymer saponified product, and the like can be used. These films may be used alone or may be used by laminating two or more kinds thereof in combination.

Although the total thickness of the laminate 10A is not particularly limited, for example, in a case of using the laminate to produce a packaging bag, from the viewpoint of ease of bag making, the strength of a packaging bag to be produced, and the like, the thickness thereof is preferably 50 to 250 μm and more preferably 80 to 130 μm. In a case in which the thickness is equal to or more than the lower limit of the above range, excellent strength is obtained and in a case in which the thickness is equal to or less than the upper limit of the above range, bag making properties are excellent.

The laminate 10A is produced by laminating a member (a) 16 formed of a laminate in which the sealant layer 14, the adhesive layer (Y) 22, the second gas barrier layer 12, the adhesive layer (Y) 22, and the base layer 13 are sequentially laminated, and a member (b) formed of the first gas barrier layer 11 with the adhesive layer (X) 21.

In such a production method, the adhesive layer (Y) 22 is formed by using the adhesive (y) which generates carbon dioxide in the reaction process during curing when the member (a) 16 which is a laminate is produced.

However, since the member (a) 16 has only one gas barrier layer, even in a case in which carbon dioxide is generated from the adhesive (y) at the time of producing the member (a) 16, the generated carbon dioxide can permeate the base layer 53 and the sealant layer 14 not having gas barrier properties, and can be released to the outside air. Therefore, bubbles do not remain in the obtained member (a) 16, In a case in which the member (h) which is the first gas barrier layer 11 is laminated on the side of the member (a) 16 close to the base layer 13, the adhesive (x) which does not generate gas such as carbon dioxide is used.

Therefore, the finally obtained laminate 10A does not contain gas resulting from the adhesive used, and the external appearance of the laminate 10A is excellent without bubbles.

In a case in which the adhesive (x) contains a compound having an aromatic compound such as meta-xylylene diamine, the adhesive layer (X) 21 formed from the adhesive (x) itself has gas barrier properties. That is, the laminate 10A has two gas barrier layers and also has the adhesive layer (X) 21 having gas barrier properties. Therefore, the obtained laminate 10A has very high gas barrier properties and is suitable for a packaging material for packaging a content including a substance having small molecules, for example, hydrogenous water.

In addition, in such a method, the sealant layer 14, the second gas barrier layer 12, and the base layer 13 are laminated using the adhesive (y) when the member (a) which is a laminate is produced. The adhesive layer (Y) 22 formed from the adhesive (y) has higher adhesive strength than that of the adhesive layer (X) 21 and has higher adhesive strength particularly with a metal. Therefore, by using the adhesive (x) which does not generate gas in a case in which the member (a) and the member (b) are laminated and using the adhesive (y) which has excellent adhesive strength in a case in which the sealant layer 14 and the base layer 13 are respectively bonded to both surfaces of the second gas barrier layer 12 formed of a metal foil, a laminate having excellent interlayer adhesive strength suitable for producing a packaging bag for liquid and a large packaging bag, and not having a defect in the external appearance can be obtained.

That is, in a case of laminating a member formed of one arbitrary gas barrier layer and a member formed of one another gas barrier layer, in a case of laminating a member formed of one arbitrary gas barrier layer and a member formed of a laminate having one another gas barrier layer, or in a case of laminating a member formed of a laminate having one arbitrary gas barrier layer and a member formed of a laminate having one another gas barrier layer, the lamination is performed with the adhesive layer (X), and in a case in which the member is a laminate, by laminating each layer of the laminate with the adhesive layer (Y), a laminate having both excellent external appearance and strength can be obtained.

Figure 2:
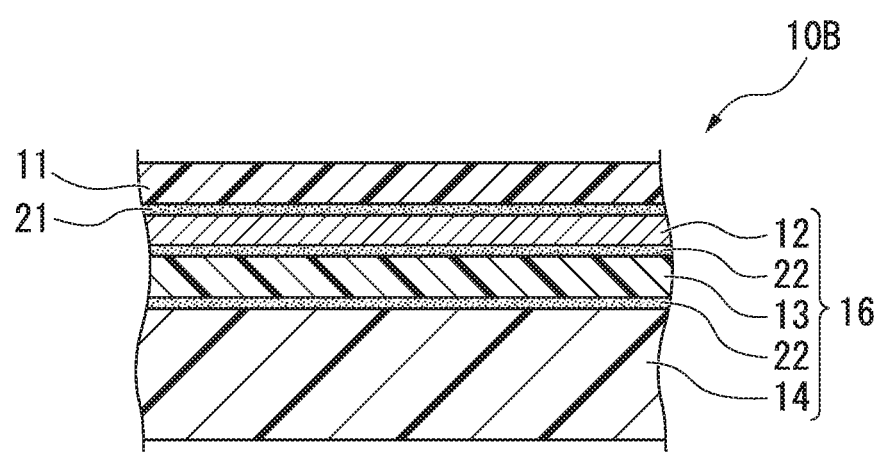
FIG. 2 is a cross-sectional view showing another example of the laminate of the present invention.

FIG. 2 is a cross-sectional view showing another example of the laminate of the present invention.

A laminate 10B in FIG. 2 has two gas barrier layers of the first gas barrier layer 11 and the second gas barrier layer 12, similar to the laminate 10A in FIG. 1. However, the laminate 10B in FIG. 2 is different from the laminate 10A in FIG. 1 in that the positions of the base layer 13 and the second gas barrier layer 12 are switched.

The laminate 10B is produced by laminating the member (a) 16 formed of a laminate in which the sealant layer 14, the adhesive layer (Y) 22, the base layer 13, the adhesive layer (Y) 22, and the second gas barrier layer 12 are sequentially laminated, and the member (b) formed of the first gas barrier layer 11 with the adhesive layer (X) 21.

In this case, when the member (a) 16 which is a laminate is produced, the adhesive (y) which generates carbon dioxide in the reaction process during curing is used to form the adhesive layer (Y) 22. However, the generated carbon dioxide can permeate the base layer 13 and the sealant layer 14 not having gas barrier properties and can be released to the outside air. Therefore, bubbles do not remain in the obtained member (a) 16.

In a case in which the member (b) which is the first gas barrier layer 11 is laminated on the side of the member (a) 16 close to the second gas barrier layer 12, the adhesive (x) which does not generate gas such as carbon dioxide is used.

Therefore, the finally obtained laminate 10B does not contain gas resulting from the adhesive used and the external appearance of the laminate 10B is excellent without bubbles.

In the laminate 10B in FIG. 2, in a case of forming a packaging bag using the sealant layer 14 as an inner surface and storing a content in the packaging bag, the base layer 13 is present between the second gas barrier layer 12 formed of a metal foil and the content. Thus, in a case of a hard content, the strength of the piercing resistance against the content is excellent.

In the laminate of the present invention, all adhesive layers for bonding the layers may be the adhesive layers (X) formed of the adhesive (x). However, as described above, it is preferable that the adhesive layer (Y) having higher adhesive strength than that of the adhesive layer (X) is used together with the adhesive layer (X) from the viewpoint that a packaging bag having excellent external appearance and excellent strength can be formed.

In the above examples, the laminates 10A and 10B each having two gas barrier layers are shown. However, the laminate of the present invention may have three or more gas barrier layers as required as long as at least one adhesive layer (X) is provided between one arbitrary gas barrier layer and another gas barrier layer.

Figure 3:
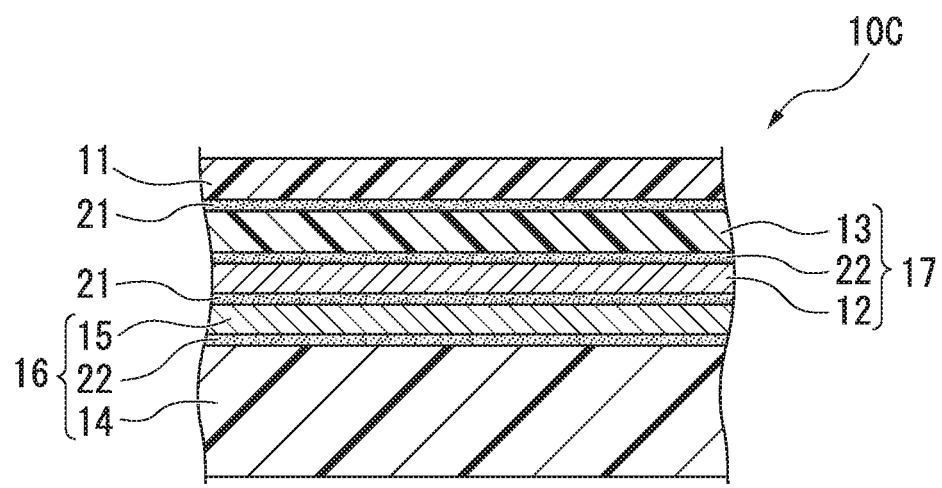
FIG. 3 is a cross-sectional view showing still another example of the laminate of the present invention.

A laminate 10C in FIG. 3 has the first gas barrier layer 11, the second gas barrier layer 12, and a third gas barrier layer 15, and the adhesive layer (X) 21 formed of the adhesive (x) is arranged between one gas barrier layer and another gas barrier layer closest to the gas barrier layer, that is, between the first gas barrier layer 11 and the second gas barrier layer 12, and between the second gas barrier layer 12 and the third gas barrier layer 15, respectively. In addition, as shown in the drawing, the laminate 10C in FIG. 3 has the base layer 13 and the sealant layer 14, and the adhesive layer (Y) 22 is arranged between the base layer 13 and the second gas barrier layer 12, and between the sealant layer 14 and the third gas barrier layer 15, respectively.

The laminate 10C is produced by laminating the member (a) 16 formed of a laminate in which the sealant layer 14, the adhesive layer (Y) 22, and the third gas barrier layer 15 are sequentially laminated, a member (c) 17 formed of a laminate in which the second gas barrier layer 12, the adhesive layer (Y) 22, and the base layer 13 are sequentially laminated, and the member (b) formed of the first gas barrier layer 11 with the adhesive layer (X) 21.

In such a method, when the member (a) 16 and the member (c) 17 which are laminates are produced, the adhesive (y) which generates carbon dioxide in the reaction process during curing is used but the generated gas can permeate the sealant layer 14 and the base layer 13 not having gas barrier properties and can be released to the outside air. Therefore, bubbles do not remain in the obtained member (a) 16 and member (c) 17.

In a case in which the obtained member (a) 16 and member (c) 17, and the member (b) which is the first gas barrier layer 11 are laminated, the adhesive (x) which does not generate gas such as carbon dioxide is used between these layers.

Therefore, the finally obtained laminate 10C does not contain gas resulting from the adhesive used and the external appearance of the laminate 10C is excellent without bubbles.

In the production of the laminate having three or more gas barrier layers as described above, each member is laminated with the adhesive layer (X) and in a case in which the member is a laminate, each layer of the laminate is laminated with the adhesive layer (Y). Then, a laminate having both excellent external appearance and strength can be obtained.

[Packaging Bag, Packaging Bag with Plug, and Hydrogenous Water Containing Packaging Bag with Plug]

A packaging bag of the present invention is a bag formed of the laminate of the present invention and is formed into a bag by a method of making the laminates face each other and closing the peripheral edges, and the like. For example, as shown in FIGS. 1 to 3, in the case of the laminates 10A, 10B, and 10C having the heat scalable sealant layer 14, a packaging bag can be produced by making the sealant layers 14 face each other and thermally fusing the peripheral edges by heat sealing.

The shape of the packaging bag is not particularly limited and examples of the shape of the packaging bag include a flat bag formed of a pair of flat portions, a gusset bag formed of a pair of flat portions and a pair of side surface portions (gusset portions), and a bottom gusset bag provided with a bottom portion.

In addition, the laminate forming the packaging bag of the present invention has a plurality of gas barrier layers and further has the adhesive layer (X) formed of the adhesive (x) having excellent gas barrier properties. Therefore, the laminate is suitable for storing the content requiring particularly high gas barrier properties.

Examples of such a content include hydrogenous water containing hydrogen having small molecules.

Figure 4:
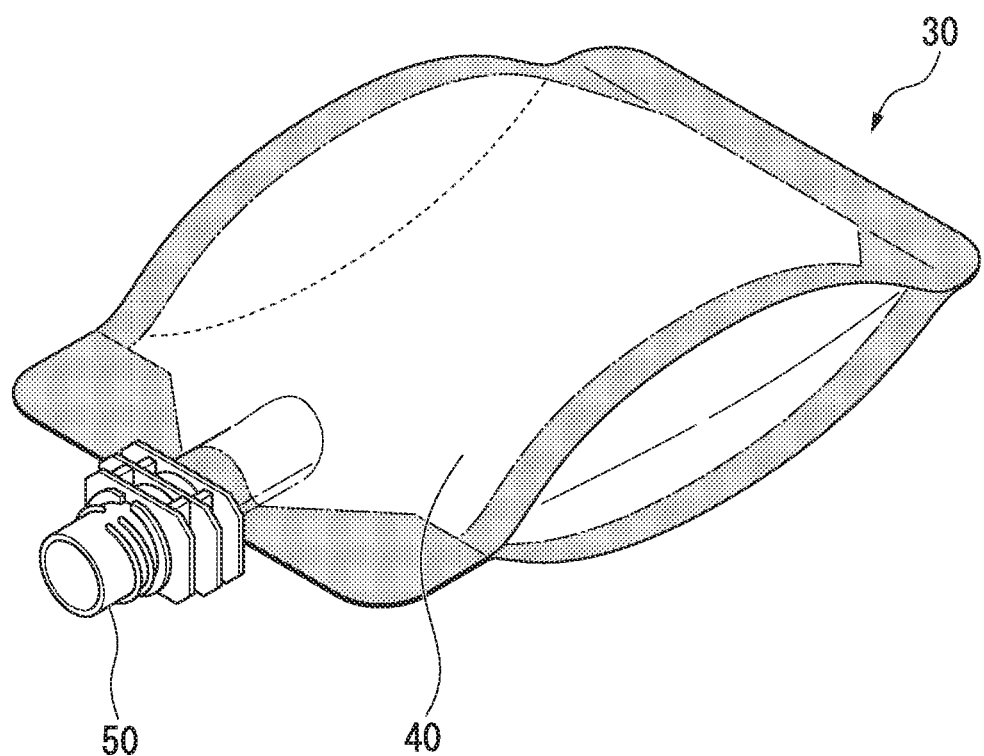
FIG. 4 is a perspective view showing an example of a packaging hag with a plug of the present invention.

FIG. 4 is a perspective view showing an example of a packaging bag 30 with a plug of the present invention. The packaging bag 30 with a plug in this example is formed by attaching a plug 50 to a packaging bag 40 formed of the laminate of the present invention.

By attaching the plug 50 to the packaging bag in this manner, the packaging bag 30 with a plug with which the content of the packaging bag 40 can be directly put into the mouth is formed. The plug includes a spout and a cap (not shown).

The material and the shape of the plug 50 are not particularly limited and known plugs of resin molded products can be used. However, a plug having gas barrier properties is preferable. Since the packaging bag of the present invention is formed of the laminate having high gas barrier properties, the plug to be attached to the packaging bag also has barrier properties, and thus a packaging bag with a plug having excellent gas barrier properties can be obtained.

Examples of the plug having gas barrier properties include a plug imparted with gas barrier properties by providing a film having gas barrier properties in a cylindrical opening portion of the spout of the plug protruding from a packaging bag to the outside.

Figure 5:
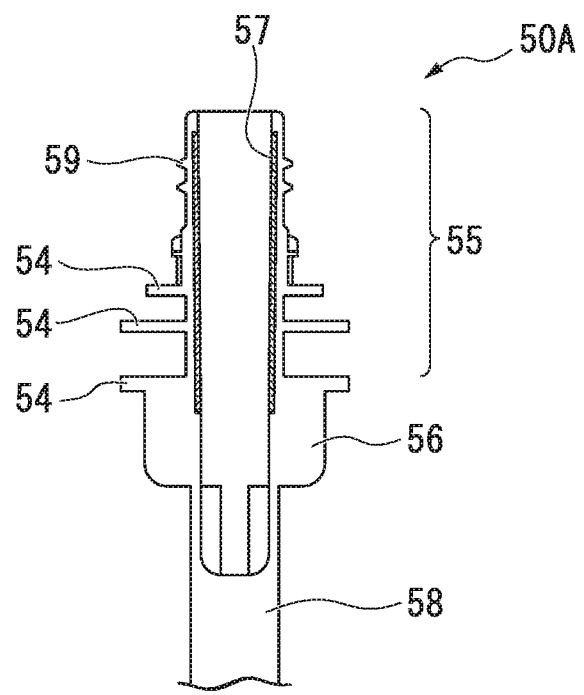
FIG. 5 is a cross-sectional view showing an example of a plug having gas barrier properties.

A spout 50A in FIG. 5 is a cross-sectional view showing an example of a spout of a plug imparted with gas barrier properties. The spout 50A in this example has a cylindrical opening portion 55 which is a portion protruding from the packaging bag to the outside, and a close contact portion 56 which is continuously formed on one end of the opening portion 55 and is attached to the inside of the packaging bag in a close contact state. In addition, the plug 50A in this example further has a rod-like closure prevention member 58 which is inserted into the packaging bag to prevent the closure of the inner space of the packaging bag.

In the upper portion of the outer periphery of the opening portion 55, a thread 59 for screwing a cap (not shown) used to close the opening portion 55 is formed. In addition, in this example, in the lower portion of the outer periphery of the opening portion 55, a flange 54 functioning as a gripped portion gripped when the spout 50A is attached to the packaging bag is provided.

It is preferable that the spout 50A is integrally formed of a resin. Although the kind of the resin is not particularly limited, since the close contact portion 56 is suitably attached to the sealant layer of the laminate forming the packaging bag by thermal fusion, the spout 50A is preferably formed of the same material as the material of the sealant layer of the laminate.

Inside the opening portion 55, a barrier cylinder (hatched portion in FIG. 5) 57 having barrier properties is formed integrally with the opening portion 55 by insert molding. The outer diameter of the barrier cylinder 57 is almost the same as the inner diameter of the opening portion 55. In addition, the barrier cylinder 57 is provided to extend over the substantially full length of the opening portion 55 protruding from the packaging bag to the outside.

As the barrier cylinder 57, a barrier cylinder including a cylinder main body formed by injection molding or the like, and a film having gas barrier properties wound around the outer periphery of the cylinder main body may be used.

In a case of producing the spout 50A by insert molding, the barrier cylinder 57 can be integrally formed with the opening portion 55 by setting such a barrier cylinder 57 in a mold in advance, and a film having gas barrier properties is provided to the opening portion 55, so that a plug having gas barrier properties can be obtained.

Examples of the film having gas barrier properties include a metal foil such as an aluminum foil, an ethylene-vinyl alcohol copolymer (EVOH) film, and an inorganic vapor deposition film, and from the viewpoint of excellent gas barrier properties, a metal foil is preferable.

The barrier cylinder 57 using the film having gas barrier properties has been described above but the film having gas barrier properties may not be provided by forming the barrier cylinder itself by injection molding using a resin having barrier properties such as an EVOH resin.

In addition, in order to further improve the gas barrier properties, as the cap for closing the opening portion of the spout of the plug, a cap 61 imparted with barrier properties may be used.

Figure 6:
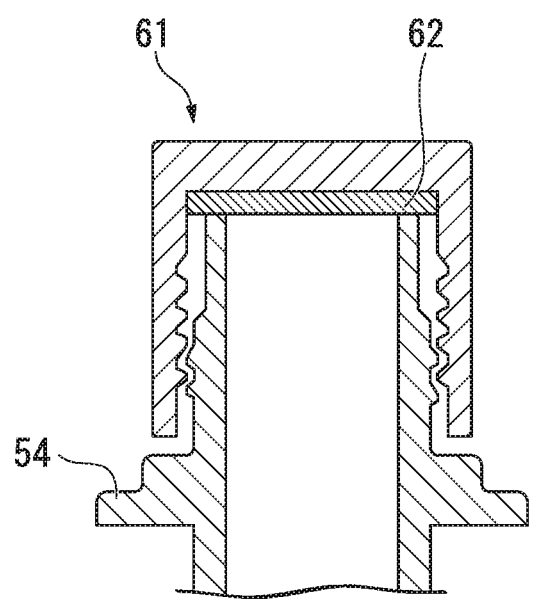
FIG. 6 is a cross-sectional view showing an example of a cap having gas barrier properties.

The cap imparted with barrier properties is configured such that a film 62 having gas barrier properties at a position for closing the opening portion of the spout is embedded in the cap main body (refer to FIG. 6).

Examples of the film having gas barrier properties include films having a metal foil such as an aluminum foil, an ethylene-vinyl alcohol copolymer (EVOH) film, and an inorganic vapor deposition film.

It is preferable that the surface of the film having gas barrier properties which is in direct contact with the opening portion of the spout is formed by a layer formed of a resin that can be heat-welded with the resin forming the opening portion. Further, it is preferable that the surface is formed by a layer formed of a resin that can be easily peeled off from the opening portion of the spout. An easy peel film is preferably used since the film can be heat-welded with the opening portion of the spout and can be easily peeled off.

It is preferable that the surface of the film having gas barrier properties which is in contact with the inside of the cap main body is formed by a layer formed of a resin that can be heat-welded with the cap main body.

It is preferable that the opening portion of the spout and the film having gas barrier properties embedded in the cap are welded by ultrasonic waves, high-frequency induction, electromagnetic induction, and the like, and the welding method is determined according to the material of the film having gas barrier properties. For example, in a case in which the film having gas barrier properties has a metal foil, the welding is preferably performed by electromagnetic induction.

For example, in a case in which the spout and the cap are formed of a polyethylene-based resin, the film having gas barrier properties may be structured such that each of layers "linear low density polyethylene (LLDPE) film/adhesive/biaxially stretched polyethylene terephthalate (PET) film/adhesive/aluminum foil/adhesive/easy peel film" is laminated from the cap side to the spout side by a dry lamination method.

In the packaging bag with a plug of the present invention provided with the spout 50A and the cap 61 imparted with gas barrier properties, both the packaging bag and the plug have excellent gas barrier properties. Therefore, the packaging bag is suitable for filling with a beverage that is easily deteriorated by oxygen or the like or jelly-like food, but particularly suitable for filling with hydrogenous water in which hydrogen which has small molecules and easily permeates a film or the like is dissolved.

In a hydrogenous water containing packaging bag with a plug of the present invention filled with hydrogenous water as described above, a defect in the external appearance does not occur in the laminate forming the packaging bag. In addition, the residual ratio of hydrogen in the filled hydrogenous water can be maintained at a high level by using a plug imparted with gas barrier properties as the plug.

EXAMPLES

Hereinafter, the present invention will be described in detail using examples.

Example 1

A laminate having the configuration in FIG. 1 was produced in the following manner.

First, a LLDPE film for forming the sealant layer 14, an aluminum foil for forming the second gas barrier layer 12, and a biaxially stretched polyamide film for forming the base layer 13 were laminated and bonded to one another by a dry lamination method using the adhesive (y) which is a two-component reaction polyurethane-based adhesive, and thus the member (a) 16 formed of the laminate having a film configuration of "sealant layer/adhesive layer (Y) (application amount: 3.5 g/m$^2$)/second gas barrier layer/adhesive layer (Y) (application amount: 3.5 g/m$^2$)/base layer" was produced.

The base layer 13 of the obtained member (a) 16 and the member (b) formed of a gas barrier transparent resin film for forming the first gas barrier layer 11 were bonded to each other by a dry lamination method using the adhesive (x) having a polyepoxy resin as a main ingredient and a polyamine resin as a curing agent, and thus a laminate of Example 1 was produced. The amount of the adhesive layer (X) applied was set to 2.0 g/m$^2$.

The details of the materials used for forming the laminate will be shown in Table 1.

A packaging bag (gusset bag) having gusset portions on the side portions was produced using the obtained laminate in the following manner and a plug having barrier properties was attached to the packaging bag to produce a packaging bag with a plug.

First, the obtained laminate was cut and a pair of films for flat portions and a pair of films for side surface portions were obtained. Then, the pair of films for flat portions and the pair of films for side surface portions were arranged such that the sealant layers 14 facing each other and the side seal was heat-sealed under the condition of a temperature of 150° C. to 200° C. and the bottom seal was heat-sealed under the condition of a temperature of 200° C. to 250° C. so as to produce a packaging bag as a gusset bag. Subsequently, a plug having barrier properties was inserted into the upper end portion of the packaging bag which was not heat-sealed, and heat-sealing was performed under the condition of a temperature of 150° C. to 250° C. to close the upper end portion of the packaging bag and to attach the plug to the packaging bag. Thus, a packaging bag with a plug was obtained.

Hydrogenous water was stored in the obtained packaging bag with a plug, and the plug was closed with a cap so as to obtain a hydrogenous water containing packaging bag with a plug.

As the spout of the plug having barrier properties, a polyethylene spout having a cylindrical opening portion protruding from the packaging bag to the outside in a case in which the spout is attached to the packaging bag, and a close contact portion continuously formed in one end of the opening portion and attached to the packaging bag in a close contact state was used. In the plug, a barrier cylinder in which an aluminum foil, as a film having gas barrier properties, was wound around the outer periphery of the cylindrical main body formed of polyethylene was integrally formed inside the opening portion of the spout. By integrally forming the barrier cylinder in this manner, gas barrier properties are imparted to the plug.

Regarding the obtained laminate, external appearance was evaluated.

First, regarding the hydrogenous water containing packaging bag with a plug, the residual ratio of hydrogen in the filled hydrogenous water was measured.

The methods of evaluation and measurement are as shown below.

In addition, the results are shown in Table 2.

Evaluation of External Appearance

The surface of the obtained laminate was visually observed.

Evaluation of Residual Ratio of Hydrogen

The packaging bag with a plug was filled with hydrogenous water and after 16 weeks had elapsed from the filling, the dissolved hydrogen concentration (H2) of the hydrogenous water was measured. The numerical value (%) of the dissolved hydrogen concentration (H2) in a case in which the dissolved hydrogen concentration (H1) of the hydrogenous water was 100% immediately after the filling was obtained and the numerical value (%) was evaluated in three steps of A, B, and C.

The dissolved hydrogen concentrations (H1) and (H2) were measured using a dissolved hydrogen meter "KM2100DH" manufactured by Kyoei Denshi Kenkyusho. The storage temperature and the measurement temperature of the hydrogenous water containing packaging bag with a plug were set to 23° C. In addition, the number of samples to be measured was 3 (n=3), and the average value of the three samples was used.

A: 85% or higher
B: 60% or higher and less than 85%
C: less than 60%

Example 2

A hydrogenous water containing packaging bag with a plug was produced in the same manner as in Example 1 except that as the spout of the plug, a barrier cylinder around which an aluminum foil was wound was not integrally formed and a plug not having barrier properties was used and was evaluated in the same manner as in Example 1. The results are shown in Table 2.

Example 3

A laminate having the configuration in FIG. 2 was produced using the material shown in Table 1 in the following manner.

First, an LLDPE film for forming the sealant layer 14, a biaxially stretched polyamide film for forming the base layer 13, and an aluminum foil for forming the second gas barrier layer 12 were bonded to one another by a dry lamination method using the adhesive (y) which is a two-component reaction polyurethane-based adhesive, and thus the member (a) 16 having a film structure of "sealant layer/adhesive layer (Y) (application amount: 3.5 g/m²)/base layer/adhesive layer (Y) (application amount: 3.5 g/m²)/second gas barrier layer" was produced.

Then, the second gas barrier layer 12 of the obtained member (a) 16 and the member (b) formed of a gas barrier transparent resin film for forming the first gas barrier layer 11 were bonded to each other by a dry lamination method using the adhesive (x) having a polyepoxy resin as a main ingredient and a polyamine resin as a curing agent, and thus a laminate of Example 3 was produced. The amount of the adhesive layer (X) applied was set to 2.0 g/m².

A hydrogenous water containing packaging bag with a plug was produced in the same manner as in Example 1 except that the obtained laminate was used and was evaluated in the same manner as in Example 1. The results are shown in Table 2.

Example 4

A laminate of Example 4 was produced in the same manner as in Example 1 except that as the second gas barrier layer 12, the same gas barrier transparent resin film as the first gas barrier layer 11 was used instead of an aluminum foil.

A hydrogenous water containing packaging bag with a plug was produced in the same manner as in Example 1 except that the obtained laminate was used and was evaluated in the same manner as in Example 1. The results are shown in Table 2.

Example 5

A hydrogenous water containing packaging bag with a plug was produced in the same manner as in Example 1 except that a spout with which a barrier cylinder formed of an EVOH resin was integrally formed was used as the spout of the plug formed of polyethylene and was evaluated in the same manner as in Example 1. The results are shown in Table 2.

Example 6

A laminate of Example 6 was produced in the same manner as in Example 1 except that a film having gas barrier properties was provided inside the cap with which the opening portion of the spout for the plug was closed.

The film having gas barrier properties adopted a configuration of "30 μm linear low density polyethylene (LLDPE) film/adhesive/12 μm biaxially stretched polyethylene terephthalate (PET)/adhesive/7 μm aluminum foil/adhesive/30 μm easy peel film".

The LLDPE film is "UB-1" manufactured by Tamapoly Co., Ltd. and has a thickness of 30 μm.

The biaxially stretched PET film is "E5200" manufactured by Toyobo Co., Ltd. and has a thickness of 12 μm.

The aluminum foil is manufactured by Mitsubishi Aluminum Co., Ltd. and has a thickness of 7 μm.

The easy peel film is "9501C" manufactured by Toray Advanced Film Co., Ltd. and has a thickness of 30 μm.

Adhesive: adhesive (y) for dry lamination

The size of the film having gas barrier properties is a circle with a diameter of 11 mm (the same size as the size of the inner portion of the cap).

After the spout was closed with the cap, the opening portion of the spout and the film having gas barrier properties of the cap were welded using an electromagnetic induction welder (UHT-1500, manufactured by Seidensha Electronics Co., Ltd.) at an output of 1,500 W and an oscillation frequency of 150 kHz for a sealing time of 0.5 seconds.

The evaluation was performed in the same manner as in Example 1. The results are shown in Table 2.

Comparative Example 1

A laminate of Comparative Example 1 was produced in the same manner as in Example 1 by producing a member having a film configuration of "sealant layer/adhesive layer (Y)/second gas barrier layer/adhesive layer (Y)/base layer" and then bonding the base layer of the obtained member and a gas barrier transparent resin film for forming the first gas barrier layer by a dry lamination method using the adhesive (y).

A hydrogenous water containing packaging bag with a plug was produced in the same manner as in Example 1 except that the obtained laminate was used and evaluated in the same manner as in Example 1. The results are shown in Table 2.

TABLE 1

| Material used | Details | |
|---|---|---|
| Gas barrier transparent resin film | Transparent barrier biaxially stretched PET film (thickness: 12 μm) | "MAXBARRIER R" manufactured by Mitsui Chemicals, Inc. |
| Biaxially stretched polyamide film | Biaxially stretched polyamide film (thickness: 15 μm) | "ONUB" manufactured by UNITIKA Ltd. |
| Aluminum foil | Aluminum foil (thickness: 7 μm) | Manufactured by Mitsubishi Aluminum Co., Ltd. |
| LLDPE film | Linear low density polyethylene film (thickness: 70 μm) | "MS-678C" manufactured by Idemitsu Unitech Co., Ltd. |
| Adhesive (x) | Adhesive having polyepoxy resin as main ingredient and polyamine resin as curing agent and including methanol and ethyl acetate as solvents | "MAXIVE" manufactured by Mitsubishi Gas Chemical Company, Inc. Main ingredient: M-100 Curing agent: C-93T |
| Adhesive (y) | Two-component reaction polyurethane-based adhesive including ethyl acetate as solvent | Manufactured by DIC Graphics Co., Ltd. Main ingredient: LX-500 Curing agent: KO-55 |

TABLE 2

| | External appearance | Residual ratio of hydrogen |
|---|---|---|
| Example 1 | Good | A |
| Example 2 | Good | C |
| Example 3 | Good | A |
| Example 4 | Good | B |
| Example 5 | Good | B |
| Example 6 | Good | A |
| Comparative Example 1 | Defect in the external appearance due to bubbles | B |

INDUSTRIAL APPLICABILITY

According to the present invention, it is possible to provide a laminate having excellent gas barrier properties in which generation of bubbles is reliably suppressed without separately providing a surface protective layer or the like and a defect in the external appearance does not occur, a packaging bag using the laminate, a packaging bag with a plug formed by attaching a plug to the packaging bag, and a hydrogenous water containing packaging bag with a plug formed by filling the packaging bag with a plug with hydrogenous water.

REFERENCE SIGNS LIST 10A, 10B, 10C: laminate
11: first gas barrier layer
12: second gas barrier layer
13: base layer
14: sealant layer
21: adhesive layer (X)
22: adhesive layer (Y)
30: packaging bag with plug
40: packaging bag
50: plug
50A: spout of plug

The invention claimed is:

1. A laminate comprising:
a first gas barrier layer and a second gas barrier layer as a plurality of gas barrier layers, and
a sealant layer,
wherein at least one adhesive layer (X) formed of an adhesive (x) having a polyepoxy resin as a main ingredient and a polyamine resin as a curing agent is provided between the first gas barrier layer and the second gas barrier layer,
wherein the first gas barrier layer is formed of a gas barrier transparent resin film comprising an inorganic vapor deposition layer disposed thereon,
wherein the second gas barrier layer is formed of a metal foil,
wherein the first gas barrier layer, the adhesive layer (X), a base layer, an adhesive layer (Y), the second gas barrier layer, an adhesive layer (Y), and the sealant layer are laminated in order, and
wherein the adhesive layer (Y) is formed of an adhesive (y) having a polyol component as a main ingredient and a polyisocyanate component as a curing agent.

2. A packaging bag comprising:
the laminate according to claim 1.

3. A hydrogenous water containing packaging bag formed by filling the packaging bag according to claim 2 with hydrogenous water.

4. A packaging bag with a plug formed by attaching a plug to the packaging bag according to claim 2.

5. The packaging bag with a plug according to claim 4, wherein the plug has barrier properties.

6. The packaging bag with a plug according to claim 5, wherein the plug has a cap and the cap has barrier properties.

7. A hydrogenous water containing packaging bag with a plug formed by filling the packaging bag with a plug according to claim 4 with hydrogenous water.

8. A hydrogenous water containing packaging bag with a plug formed by filling the packaging bag with a plug according to claim 5 with hydrogenous water.

9. A hydrogenous water containing packaging bag with a plug formed by filling the packaging bag with a plug according to claim 6 with hydrogenous water.

* * * * *